Sept. 21, 1926.

R. W. SOHL 1,600,908

CONTAINER FOR RUBBER REPAIR MATERIAL

Filed June 9, 1925

INVENTOR
Ralph W. Sohl,
BY
ATTORNEY

Patented Sept. 21, 1926.

1,600,908

UNITED STATES PATENT OFFICE.

RALPH W. SOHL, OF AKRON, OHIO, ASSIGNOR TO THE GOODYEAR TIRE & RUBBER COMPANY, OF AKRON, OHIO, A CORPORATION OF OHIO.

CONTAINER FOR RUBBER REPAIR MATERIAL.

Application filed June 9, 1925. Serial No. 35,926.

My invention relates to containers, and it has particular reference to an improved removable top for a container designed to protect rubber repair material.

Repair kits for automobiles and like vehicles using rubber tires usually include patching material with which punctures and blow-outs may be mended on the road. The patching material includes a piece of rubber gum which is not completely vulcanized. This material is commonly contained in an elongate metal can.

It has been proposed to perforate the lid of the container, in order to provide a tool with which to roughen the tube or rubber to be repaired, before the patch is applied. This tool has been found satisfactory, but a lid perforated in this manner allows air and dirt to enter the container. As a result, the partially vulcanized rubber gum contained in the patching material deteriorates to an extent which renders it unsatisfactory for roadside repairs.

It is an object of this invention to improve the container by providing means to exclude air and foreign matter from the repair material, while retaining the desirable features of containers including a rasping tool.

One method of practicing the invention is shown in the accompanying drawing, wherein.

Figure 1:
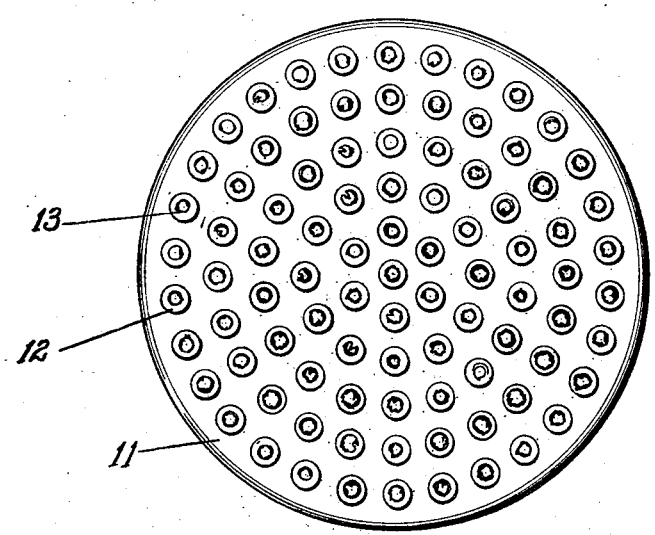
Fig. 1 is a plan view of an improved lid for a repair container.
Figure 2:
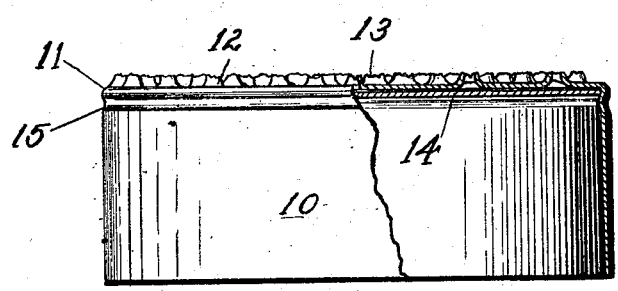
Fig. 2 is a view in elevation, with parts broken away.

The drawing shows a conventional cylindrical metal lid, comprising a side-wall 10 and an end-wall 11. According to present practice, the lid is perforated by imposing a suitable tool against the under side of the end wall 11. The tool forces the metal outwardly in conical projections 12, having irregular apertures 13.

A lid made in this manner serves not only to cover the top of the can and keep the repair material in place, but it may be used to scrape the surface around the puncture or blowout, in a manner well known to motorists. A lid of this character will not, however, protect the material in the container.

In order to protect the repair material, a thin plate 14, preferably of metal, is placed inside the lid, after the apertures 13 have been punched out. The plate is of sufficient diameter to fit snugly within the lid. After the plate 14 has been inserted, the side wall 10 of the lid is spun over, or otherwise indented, as indicated at 15, to retain the plate in place. The plate 14 may, of course, be secured in its proper position by fastening it to the top of the lid by an adhesive or other means.

A container having a lid thus formed has all the desirable properties of the older types of lids. It provides a protective cover and includes a rasping tool.

The invention is subject to various modifications. Thus, the perforations and protecting plate need not be positioned in the lid of the can, they may be placed in the bottom of the can itself, and an imperforate lid may be employed. The invention is to be limited only by the scope of the appended claims.

What I claim is:

1. A rubber repairing tool comprising a receptacle adapted to receive repair material provided with a lid formed with a plurality of roughened perforations on the surface thereof, and an imperforate wall between the perforations and the interior of the receptacle, providing a barrier to the entrance of fluid and dirt within the receptacle.

2. A receptacle comprising a side-wall and an end-wall, a rasping tool formed in one of the walls, and an imperforate surface positioned adjacent the rasping tool.

3. A receptacle comprising a side-wall, an end-wall provided with perforations, and an imperforate plate secured in the receptacle adjacent the end wall.

4. A lid for containers comprising a side-wall, an end-well provided with perforations, and an imperforate plate positioned adjacent the end-wall and secured to the lid by an indentation in the side wall.

5. A receptacle comprising a wall perforated to form a rasping tool, and a plate positioned adjacent the perforations, whereby air is excluded from the interior of the receptacle.

6. The combination with a container, of a lid having a plurality of roughened perforations therein, and an imperforate plate secured in the lid adjacent the perforations.

In witness whereof, I have hereunto signed my name.

RALPH W. SOHL.